United States Patent [19]
Nistri et al.

[11] 3,720,645
[45] March 13, 1973

[54] METHOD OF OBTAINING GEL-FREE EPOXY RESINS BY FILTRATION IN THE MOLTEN STATE

[75] Inventors: Ugo Nistri, Milan; Silvio Vargiu, Sesto San Giovanni (Milan); Mario Pitzalis, Arcore (Milan), all of Italy

[73] Assignee: Societa Italiano Resines S.p.A., Milan, Italy

[22] Filed: Nov. 5, 1970

[21] Appl. No.: 87,334

[30] Foreign Application Priority Data

Nov. 14, 1969 Italy..............................24410 A/69

[52] U.S. Cl. ............260/47 EP, 210/71, 260/37 EP, 260/96 R

[51] Int. Cl. .............................................C08g 30/04
[58] Field of Search..260/47 EP, 348, DIG. 15, 95 R, 260/96 R, 37 EP, 9, DIG. 33; 210/69, 71, 75

[56] References Cited

UNITED STATES PATENTS

| | | | |
|---|---|---|---|
| 3,108,132 | 10/1963 | McKinney | 210/71 |
| 1,769,388 | 7/1930 | Prentice | 210/69 |
| R25,467 | 10/1963 | Logan et al. | 210/69 |

*Primary Examiner*—William H. Short
*Assistant Examiner*—T. Pertilla
*Attorney*—Sughrue, Rothwell, Mion, Zinn & Macpeak

[57] ABSTRACT

Gel-free epoxy resins are obtained by filtration of the resin molten rather than in a solvent.

8 Claims, No Drawings

METHOD OF OBTAINING GEL-FREE EPOXY RESINS BY FILTRATION IN THE MOLTEN STATE

The invention relates to epoxy resins, and more exactly to an improvement in processes for manufacturing resins as gel-free products.

It is well known that epoxy resins are obtained industrially by processes which consist essentially in bringing polyhydroxyl phenols and halohydrins into contact in the presence of a base.

Normally, of the polyhydroxyl phenols, diphenols, and of the halohydrins, epichlorohydrin, are used, the base used being of the inorganic type such as for example sodium hydroxide.

By this means, products are obtained which may be used in numerous applications such as for example in the field of paints, varnishes, or adhesives, or moulding compositions, in conjunction with resinous products of the phenol or amine type. Epoxy resins with a melting point above approx. 40°C are particularly used for high-quality coatings.

It is well known that such resins normally contain very fine dispersions of gels which give rise to various difficulties when they are used in varnishes. Thus, for example in the case of powdered varnishes, coatings are obtained which have numerous pinholes and separations, so much so that protection against chemical and atmospheric agents is rendered doubtful.

It has now been found possible to eliminate the dispersions of gels present in epoxy resins by filtering them in the molten state.

The process of the present invention is based essentially on a treatment for filtering the epoxy resin in the molten state, in the presence of filtration additives or by using special filter papers.

Specifically, the filtration additives which are useful for the purposes of the present invention consist of fossil flours derived from diatomaceous earths by crushing, drying and classification treatments, followed or not by a calcination process.

Also useful are fossil flours which have undergone a special calcining process intended to reduce the specific surface area, render insoluble certain of the impurities contained and intended to procure a white product.

Filtration additives of this type are for example those known by the commercial names:

Celite (of the Johns-Manvill Co. of New York) and
Dicalite (of the Dicalite Europe Sud. Co.).

In the preferred form, the filtration additive, in the form of granules measuring from 1 to 20 microns, is dispersed in the resin while it is maintained at a temperature of 70° to 120°C above the melting temperature.

In particular, a quantity of 0.1 to 2 parts by weight of additive is used to every 100 parts by weight of resin. The resultant product is subjected to filtration. In industrial practice, it is advisable to use horizontal plate filters, the product being re-cycled until a suitable "pre-coat" is formed.

Horizontal plate filters are understood as being constituted essentially by a vertical container fitted with horizontal rigid filter plates normally covered with a filtering gauze. Filters of this type are for example known commercially as Sparkler and Seitz filters made by the company of the same name.

As previously stated, gel dispersion can also be eliminated by filtering the epoxy resin through a porous filter paper while the resin is in the molten state.

In this case, too, it is advisable to use horizontal plate filters fitted with fiber-based porous filter papers of the nylon, glass or cellulose type. Filter papers of this type are for example known by the trade names: Seitz 0/400 and Seitz K5, made by the Seitz Werke.

The epoxy resins which are subjected to the process of the present invention are those produced by condensation from polyhydric phenols and epihalohydrins and having a melting point above about 40°C.

By using the process described, it is possible easily and economically to obtain the said resins which are completely bereft of the gel dispersions which impair their use, particularly in powdered varnishes.

An important fact is that, in the prior art, in the elimination of the gels which they contain, the epoxy resins have been filtered while dissolved in solvent. However, this procedure does not resolve the problem of obtaining solid resins which are bereft of gels. In fact, it has been noted that in the elimination of the solvent from perfectly glazed and gel-free resin solutions, solid resins are still obtained which are rich in gel-form matter. Probably, gels continue to form during the process of distilling the solvent.

The following examples illustrate the invention.

Example 1 (Comparative)

Diphenol and epichlorohydrin are placed in a reactor at a temperature of 95° to 115°C, aqueous sodium hydroxide being added over a period of 90 minutes.

In particular, the reaction involves diphenol, epichlorohydrin and sodium hydrate in molar ratios of 1 to 1.2 to 1.19.

The product of the condensation reaction is then dissolved in toluene and the aqueous phase separated by decantation. As a filtering additive, the product known commercially as Celite, made by the Johns Manville Company, is added to the toluene solution in a quantity equal to 1.5 parts by weight for every thousand parts by weight of solution.

The solution is filtered through a Sparkler type horizontal plate filter made by Sparkler International.

Re-cycling continues until a bright and completely gel-free solution is obtained.

The solvent in the filtered product is evaporated off by the thin layer technique, a pressure equal to 20 to 100 mmHg being maintained throughout this operation.

In this way, an epoxy resin to the following specifications was obtained:

Epoxy equivalent: 500
Melting range: 50 to 53°C.

The melting range was determined by the capillary method.

The resultant solid resin was analyzed to determine its brightness and degree of gel dispersion. For the purpose, the resin was dissolved in butyl carbitol to a titre equal to 50 percent by weight.

The resultant solution was placed in a glass vessel measuring 50 × 50 × 20 cm which was illuminated from below. The degree of brightness and the nature of the gels and dispersions could therefore be determined visually.

Observation was carried out in shadow because in this way it is easier to assess the phenomenon of incident light dispersion.

The results of these observations are shown in the Table after Example 4.

EXAMPLE 2

From the toluene solution of epoxy resin described under Example 1, the solvent is eliminated directly without the solution being filtered.

The resultant resin was brought to a temperature of a approximately 150°C and passed through a Sparkler type horizontal plate filter.

The porous filter paper known by the brand name Seitz 0/400 and made by the Seitz Company, was used for filtering. During filtration, the filter was heated by a fluid circulating through the outer jacket to avoid the temperature inside the filter falling to levels below 120°C.

The resin obtained by filtration was analyzed and the results shown in the Table.

Example 3

The procedure set out in Example 2 was used, the porous filter paper known commercially as Seitz K5 and made by the Seitz Company, being employed. The results of analyses of the resin obtained are summarized in the Table.

Example 4

From the toluene solution of the epoxy resin described in Example 1, the solvent was eliminated directly without the solution being filtered.

To the resin maintained in the molten state at a temperature of 150°C, the filtering additive known by the brand name Celite 545 and made by the Johns Manville Company was added in a quantity equal to 1.5 parts by weight to every 100 parts by weight of resin. The resultant product was filtered over a Sparkler type horizontal plate filter.

During the filtration stage, a temperature of not less than 120°C was maintained inside the filter by using a heat exchange fluid circulating through the outer jacket.

In filtration, the product was re-cycled until a suitable "pre-coat" was obtained.

The results of analysis of the filtered resin are summarized in the Table.

It should be noted that in Examples 2 to 4, the assessments relative to brightness of the epoxy resin and the nature and dispersion of gels were carried out by the procedures described in Example 1.

Table

| Example | Brightness | Dispersion of gels |
|---|---|---|
| 1 | Moderate | Considerable |
| 2 | Optimum | None |
| 3 | Optimum | None |
| 4 | Optimum | None |

We claim:

1. A method of obtaining gel-free epoxy resins obtained by reacting polyhydroxyphenols with epihalohydrins in the presence of a base and having a melting point above about 40°C comprising maintaining said resins at temperatures of 70° to 120°C above the melting point and subjecting said resins to filtration in the molten state.

2. A method according to claim 1, wherein the filtration is effected in the presence of a quantity of 0.1 to 2 parts by weight for every 100 parts by weight of resin, of a filtering additive consisting of granular fossil flour.

3. A method according to claim 2, wherein said fossil flour is used in the form of granules measuring from 1 to 20 microns.

4. A method according to claim 2, wherein horizontal plate filters are used for the filtration.

5. A method according to claim 1, wherein the filtration is effected by coarse filter papers.

6. A method according to claim 5, wherein horizontal plate filters are used for the filtration.

7. A method according to claim 1, wherein said resins are solvent free.

8. A method according to claim 2, wherein said fossil flour is derived from diatomaceous earth.

* * * * *